(12) United States Patent
Kumar et al.

(10) Patent No.: US 9,900,113 B2
(45) Date of Patent: Feb. 20, 2018

(54) UNIVERSAL TESTER HARDWARE

(71) Applicant: Contec, LLC, Schenectady, NY (US)

(72) Inventors: Samant Kumar, San Jose, CA (US); Shivashankar Diddimani, Karnataka (IN); Hemanth Nekkileru, San Jose, CA (US); James Christopher Collip, Sunnyvale, CA (US); Naresh Chandra Nigam, San Jose, CA (US); Mrinal Mathur, San Jose, CA (US)

(73) Assignee: Contec, LLC, Schenectady, NY (US)

( * ) Notice: Subject to any disclaimer, the term of this patent is extended or adjusted under 35 U.S.C. 154(b) by 0 days.

(21) Appl. No.: 15/057,085

(22) Filed: Feb. 29, 2016

(65) Prior Publication Data
US 2017/0250762 A1    Aug. 31, 2017

(51) Int. Cl.
*H04B 17/00* (2015.01)
*H04B 17/16* (2015.01)

(52) U.S. Cl.
CPC .................................. *H04B 17/16* (2015.01)

(58) Field of Classification Search
CPC ..... H04L 43/045; H04L 43/50; H04L 41/145; H04B 17/00–17/15; H04H 20/12; G01R 31/28–31/317; G01R 35/00
USPC ....... 455/423–425, 67.11–67.7, 115.1–115.4, 455/226.1–226.4, 575.1–575.8, 90.3, 455/347–351
See application file for complete search history.

(56) References Cited

U.S. PATENT DOCUMENTS

| | | | |
|---|---|---|---|
| 5,917,808 A * | 6/1999 | Kosbab | H04L 43/045 370/245 |
| 6,308,496 B1 * | 10/2001 | Lee | B23P 21/004 198/345.3 |
| 6,367,032 B1 | 4/2002 | Kasahara | |
| 6,662,135 B1 | 12/2003 | Burns | |
| 6,671,160 B2 * | 12/2003 | Hayden | H05F 3/02 361/212 |
| 6,859,043 B2 * | 2/2005 | Ewing | G01R 31/2808 324/538 |
| 7,664,317 B1 | 2/2010 | Sowerby | |
| 8,121,028 B1 | 2/2012 | Schlesener | |
| 8,209,732 B2 | 6/2012 | Le et al. | |
| 8,229,344 B1 | 7/2012 | Petersen | |
| 8,324,909 B2 | 12/2012 | Oakes et al. | |
| 8,418,000 B1 | 4/2013 | Salame | |
| 8,418,219 B1 * | 4/2013 | Parsons | H04N 17/004 348/180 |

(Continued)

FOREIGN PATENT DOCUMENTS

| | | |
|---|---|---|
| CN | 202261360 | 5/2012 |
| WO | 2001013604 | 2/2001 |
| WO | 2013169728 | 11/2013 |
| WO | 2017053961 | 3/2017 |
| WO | 2017074872 | 5/2017 |

OTHER PUBLICATIONS

Kumar, Samant; Issue Notification for U.S. Appl. No. 14/866,780, filed Sep. 25, 2015, dated Oct. 19, 2016, 1 pg.

(Continued)

*Primary Examiner* — Edward Urban
*Assistant Examiner* — Rui Hu
(74) *Attorney, Agent, or Firm* — Taylor English Duma LLP

(57) ABSTRACT

A universal testing system platform with a modular and symmetrical design that provides a flexible, efficient and space saving architecture for testing wireless devices is disclosed.

8 Claims, 9 Drawing Sheets

(56) References Cited

U.S. PATENT DOCUMENTS

| | | | |
|---|---|---|---|
| 8,515,015 B2 | 8/2013 | Maffre | |
| 8,689,071 B2 | 4/2014 | Valakh | |
| 8,806,400 B1 | 8/2014 | Bhawmik | |
| 9,013,307 B2* | 4/2015 | Hussain | G06K 7/10178 |
| | | | 340/572.1 |
| 9,316,714 B2* | 4/2016 | Rada | G01R 35/005 |
| 9,319,908 B2* | 4/2016 | Nickel | H04W 24/06 |
| 9,372,228 B2 | 6/2016 | Nickel | |
| 9,402,601 B1 | 8/2016 | Berger | |
| 9,490,920 B2* | 11/2016 | Partee | H04L 43/045 |
| 9,491,454 B1 | 11/2016 | Kumar | |
| 9,571,211 B2* | 2/2017 | Partee | H04B 17/00 |
| 2002/0070725 A1 | 6/2002 | Hilliges | |
| 2003/0005380 A1 | 1/2003 | Nguyen | |
| 2003/0184035 A1* | 10/2003 | Yu | B62B 3/00 |
| | | | 280/47.35 |
| 2004/0010584 A1 | 1/2004 | Peterson | |
| 2004/0016708 A1* | 1/2004 | Rafferty | H05K 7/1492 |
| | | | 211/26 |
| 2004/0160226 A1* | 8/2004 | Ewing | G01R 31/2808 |
| | | | 324/538 |
| 2004/0189281 A1* | 9/2004 | Le | G01R 31/2808 |
| | | | 324/759.01 |
| 2005/0041642 A1 | 2/2005 | Robinson | |
| 2005/0053008 A1* | 3/2005 | Griesing | H04W 24/06 |
| | | | 370/241 |
| 2005/0102488 A1 | 5/2005 | Bullis | |
| 2005/0193294 A1 | 9/2005 | Hildebrant | |
| 2005/0286466 A1 | 12/2005 | Tagg | |
| 2006/0015785 A1 | 1/2006 | Chun | |
| 2006/0271322 A1 | 11/2006 | Haggerty | |
| 2007/0097659 A1* | 5/2007 | Behrens | G06F 1/18 |
| | | | 361/788 |
| 2007/0220380 A1 | 9/2007 | Ohanyan | |
| 2008/0117907 A1 | 5/2008 | Hein | |
| 2008/0144293 A1* | 6/2008 | Aksamit | H05K 7/1489 |
| | | | 361/727 |
| 2008/0168520 A1* | 7/2008 | Vanderhoff | H04N 17/004 |
| | | | 725/131 |
| 2008/0315898 A1 | 12/2008 | Cannon | |
| 2009/0089854 A1 | 4/2009 | Le | |
| 2009/0282446 A1* | 11/2009 | Breed | H04L 43/50 |
| | | | 725/106 |
| 2009/0282455 A1 | 11/2009 | Bell et al. | |
| 2009/0289020 A1* | 11/2009 | Wurmhoringer | H02B 1/01 |
| | | | 211/85.17 |
| 2010/0132000 A1 | 5/2010 | Straub | |
| 2010/0138823 A1 | 6/2010 | Thornley | |
| 2010/0246416 A1 | 9/2010 | Sinha | |
| 2011/0001833 A1 | 1/2011 | Grinkemeyer | |
| 2011/0006794 A1 | 1/2011 | Sellathamby | |
| 2011/0012632 A1 | 1/2011 | Merrow | |
| 2011/0035676 A1 | 2/2011 | Tischer | |
| 2011/0072306 A1 | 3/2011 | Racey | |
| 2011/0099424 A1 | 4/2011 | Rivera Trevino | |
| 2011/0116419 A1 | 5/2011 | Cholas | |
| 2011/0222549 A1 | 9/2011 | Connelly | |
| 2011/0267782 A1* | 11/2011 | Petrick | G06F 1/1628 |
| | | | 361/724 |
| 2011/0306306 A1 | 12/2011 | Reed | |
| 2012/0140081 A1 | 1/2012 | Clements | |
| 2012/0163227 A1 | 6/2012 | Kannan | |
| 2012/0198084 A1 | 8/2012 | Keskitalo | |
| 2012/0198442 A1 | 8/2012 | Kashyap | |
| 2012/0220240 A1 | 8/2012 | Rothschild | |
| 2012/0275784 A1* | 11/2012 | Soto | H04B 10/2503 |
| | | | 398/38 |
| 2012/0278826 A1 | 11/2012 | Jones | |
| 2013/0033279 A1* | 2/2013 | Sozanski | G01R 29/0821 |
| | | | 324/750.27 |
| 2013/0049794 A1* | 2/2013 | Humphrey | G01R 31/40 |
| | | | 324/764.01 |
| 2013/0076217 A1* | 3/2013 | Thompson | B65H 75/14 |
| | | | 312/309 |
| 2013/0093447 A1 | 4/2013 | Nickel | |
| 2013/0104158 A1* | 4/2013 | Partee | H04H 60/32 |
| | | | 725/14 |
| 2013/0160064 A1 | 6/2013 | Van Rozen | |
| 2013/0167123 A1 | 6/2013 | Dura | |
| 2014/0115580 A1 | 4/2014 | Kellerman | |
| 2014/0123200 A1 | 5/2014 | Park et al. | |
| 2014/0156819 A1 | 6/2014 | Cavgalar | |
| 2014/0187172 A1* | 7/2014 | Partee | H04L 43/045 |
| | | | 455/67.12 |
| 2014/0187173 A1* | 7/2014 | Partee | H04B 17/00 |
| | | | 455/67.12 |
| 2014/0207404 A1 | 7/2014 | Fritzsche | |
| 2014/0256373 A1* | 9/2014 | Hernandez | H04B 17/12 |
| | | | 455/509 |
| 2014/0266930 A1 | 9/2014 | Huynh | |
| 2014/0282783 A1 | 9/2014 | Totten | |
| 2014/0370821 A1 | 12/2014 | Guterman | |
| 2015/0024720 A1 | 1/2015 | Efrati | |
| 2015/0093987 A1 | 4/2015 | Ouyang | |
| 2015/0109941 A1 | 4/2015 | Zhang | |
| 2015/0151669 A1 | 6/2015 | Meisner | |
| 2015/0226716 A1* | 8/2015 | Nelson | G01N 33/0001 |
| | | | 73/23.34 |
| 2015/0237010 A1 | 8/2015 | Roskind | |
| 2015/0253357 A1 | 9/2015 | Olgaard | |
| 2015/0369851 A1 | 12/2015 | Even | |
| 2016/0080241 A1 | 3/2016 | Rocha De Maria | |
| 2016/0102951 A1* | 4/2016 | Cole | F41H 5/24 |
| | | | 361/679.34 |
| 2016/0191364 A1 | 6/2016 | Ajitomi | |
| 2016/0381818 A1* | 12/2016 | Mills | H05K 5/0217 |
| | | | 361/724 |
| 2017/0048519 A1 | 2/2017 | Friel | |
| 2017/0089981 A1 | 3/2017 | Kumar | |
| 2017/0093682 A1 | 3/2017 | Kumar | |
| 2017/0093683 A1 | 3/2017 | Kumar | |
| 2017/0126536 A1 | 5/2017 | Kumar | |
| 2017/0126537 A1 | 5/2017 | Kumar | |
| 2017/0126539 A1 | 5/2017 | Tiwari | |
| 2017/0149635 A1 | 5/2017 | Kumar | |
| 2017/0149645 A1 | 5/2017 | Kumar | |
| 2017/0195071 A1 | 7/2017 | Kumar | |
| 2017/0288791 A1 | 10/2017 | Kumar et al. | |
| 2017/0288993 A1 | 10/2017 | Kumar et al. | |
| 2017/0289012 A1 | 10/2017 | Tiwari et al. | |
| 2017/0302994 A1 | 10/2017 | Kumar | |

OTHER PUBLICATIONS

Kumar, Samant; Notice of Allowance for U.S. Appl. No. 14/866,780, filed Sep. 25, 2015, dated Jul. 19, 2016, 8 pgs.

Kumar, Samant; Non-Final Office Action for U.S. Appl. No. 14/866,720, filed Sep. 25, 2015, dated Jan. 23, 2017, 17 pgs.

Kumar, Samant; Notice of Allowance for U.S. Appl. No. 14/987,538, filed Jan. 4, 2016, dated Mar. 23, 2017, 12 pgs.

Kumar, Samant; International Search Report and Written Opinion for PCT/US16/53768, filed Sep. 26, 2016, dated Feb. 3, 2017, 17 pgs.

Nordman, Bruce, "Testing Products with Network Connectivity," Jun. 21, 2011 [retrieved online at http://citeseerx.is1.psu.edu/viewdoc/download?doi=10.1.1.695.772&rep=rep1&type=pdf on Feb. 6, 2017], 20 pgs.

Kumar, Samant; International Search Report and Written Opinion for PCT/US2016/058507, filed Oct. 24, 2016, dated Jan. 3, 2017, 12 pgs.

Kumar, Samant; Non-Final Office Action for U.S. Appl. No. 14/866,630, filed Sep. 25, 2015, dated Aug. 9, 2017, 24 pgs.

Kumar, Samant; Notice of Allowance for U.S. Appl. No. 14/866,720, filed Sep. 25, 2015, dated Jun. 29, 2017, 26 pgs.

Kumar, Samant; Notice of Allowance for U.S. Appl. No. 14/866,720, filed Sep. 25, 2015, dated Aug. 28, 2017, 11 pgs.

Kumar, Samant; Response to Rule 312 Communication for U.S. Appl. No. 14/866,720, filed Sep. 25, 2015, dated Jul. 26, 2017, 2 pgs.

(56) References Cited

OTHER PUBLICATIONS

Kumar, Samant; Ex-Parte Quayle Office Action for U.S. Appl. No. 14/948,925, filed Nov. 23, 2015, dated Jun. 20, 2017, 29 pgs.
Kumar, Samant; Non-Final Office Action for U.S. Appl. No. 14/987,538, filed Jan. 4, 2016, dated Jul. 21, 2017, 18 pgs.
Kumar, Samant; Non-Final Office Action for U.S. Appl. No. 15/624,961, filed Jun. 16, 2017, dated Jul. 19, 2017, 7 pgs.
Kumar, Samant; Non-Final Office Action for U.S. Appl. No. 14/929,180, filed Oct. 30, 2015, dated Aug. 22, 2017, 32 pgs.
Kumar, Samant; Non-Final Office Action for U.S. Appl. No. 14/929,220, filed Oct. 30, 2015, dated Aug. 24, 2017, 31 pgs.
Businesswire; Article entitled: "GENBAND and CTDI Settle Legal Dispute", located at <http://www.businesswire.com/news/home/20140321005528/en/GENBAND-CTDI-Settle-Legal-Dispute>, Mar. 21, 2014, 1 pg.
CED Magazine; Article entitled: "Cable Connects in Atlanta", located at <https://www.cedmagazine.com/article/2006/04/cable-connects-atlanta>, Apr. 30, 2006, 21 pgs.
TVtechnology; Article entitled: "S3 Group's Storm Test", located at <http://www.tvtechnology.com/expertise/0003/s3-groups-stormtest/256690>, published May 1, 2012, 2 pgs.
Digital Producer; Article entitled: "S3 Group Unveils Exclusive Partnership in North America With First US Storm Test(TM) Decision Line Customer", located at <http://www.digitalproducer.com/article/S3-Group-Unveils-Exclusive-Partnership-in-North-America-With-First-US-StormTest(TM)-Decision-Line-Customer--1668213>, Sep. 8, 2011, 3 pgs.
Electronic Design; Article entitled: "Testing of MPEG-2 Set-Top Boxes Must be Fast, Thorough", located at <http://www.electronicdesign.com/print/839>, published Nov. 18, 2001, 9 pgs.
Euromedia; Article entitled: "Automated TV Client testing: Swisscom partners with S3 Group to deliver the ultimate IPTV experience", located at <http://advanced-television.com/wp-content/uploads/2012/10/s3.pdf>, earliest known pub. date—May 30, 2013, 2 pgs.
Teleplan; Article entitled: "Screening & Testing", located at <https://www.teleplan.com/innovative-services/screening-testing/>, earliest known publication date Mar. 21, 2015, 7 pgs.
Promptlink Communications; Article entitled: "Promptlink Communications Officially Launches Sep-Top Box Testing Platform", located at <https://www.promptlink.com/company/assets/media/2014-05-20.pdf>, published on May 20, 2014, 2 pgs.
S3 Group; Document entitled: "White Paper: The Importance of Automated Testing in Set-Top Box Integration", earliest known publication date Jun. 17, 2014, 11 pgs.
Kumar, Samant; Notice of Allowance for U.S. Appl. No. 14/948,925, filed Nov. 23, 2015, dated Sep. 20, 2017, 15 pgs.
Kumar, Samant; Supplemental Notice of Allowance for U.S. Appl. No. 14/948,925, filed Nov. 23, 2015, dated Oct. 5, 2017, 2 pgs.
Kumar,Samant; Issue Notification for U.S. Appl. No. 14/866,720, filed Sep. 25, 2015, dated Oct. 18, 2017, 1 pg.

\* cited by examiner

UNIVERSAL TESTER HARDWARE

NOTICE REGARDING COLOR DRAWINGS

The patent or application file contains at least one drawing executed in color. Copies of this patent or patent application publication with color drawing(s) will be provided by the Office upon request and payment of the necessary fee.

CROSS REFERENCE TO RELATED APPLICATIONS

This application is related to U.S. patent application Ser. No. 14/866,720 entitled "Core Testing Machine," filed Sep. 25, 2015, and to U.S. patent application Ser. No. 14/866,752 entitled "Universal Device Testing Interface," filed Sep. 25, 2015, and to U.S. patent application Ser. No. 14/866,630 entitled "Universal Device Testing System," filed Sep. 25, 2015, and to U.S. patent application Ser. No. 14/866,780 entitled "Set Top Boxes Under Test," filed Sep. 25, 2015, and to U.S. patent application Ser. No. 14/948,143 entitled "Cable Modems/eMTAs Under Test," filed Nov. 20, 2015, and to U.S. patent application Ser. No. 14/929,180 entitled "Hardware Architecture for Universal Testing System: Cable Modem Test," filed Oct. 30, 2015, and to U.S. patent application Ser. No. 14/929,220 entitled "Hardware Architecture for Universal Testing System: Wireless Router Test," filed Oct. 30, 2015, and to U.S. patent application Ser. No. 14/948,925 entitled "Wireless Routers Under Test," filed Nov. 23, 2015, and to U.S. patent application Ser. No. 14/987,538 entitled, "Test Sequences Using Universal Testing System," filed Jan. 4, 2016, each of which are hereby incorporated by reference in its entirety.

TECHNICAL FIELD

The present disclosure is directed to a system for testing devices.

BRIEF DESCRIPTION OF THE DRAWINGS

For a better understanding of the various embodiments of the present disclosure, reference should be made to the description of embodiments below, in conjunction with the following drawings in which like reference numerals refer to corresponding parts throughout the figures.

DETAILED DESCRIPTION

Methods, systems, user interfaces, and other aspects of the present disclosure are described. Reference will be made to certain embodiments of the present disclosure, examples of which are illustrated in the accompanying drawings. While the present disclosure will be described in conjunction with the embodiments, it will be understood that it is not intended to limit the present disclosure to these particular embodiments alone. On the contrary, the present disclosure is intended to cover alternatives, modifications and equivalents that are within the spirit and scope of the present disclosure. The specification and drawings are, accordingly, to be regarded in an illustrative rather than a restrictive sense.

Moreover, in the following description, numerous specific details are set forth to provide a thorough understanding of the present disclosure. However, it will be apparent to one of ordinary skill in the art that the present disclosure may be practiced without these particular details. In other instances, methods, procedures, components, and networks that are well known to those of ordinary skill in the art are not described in detail to avoid obscuring aspects of the present disclosure.

Figure 1:
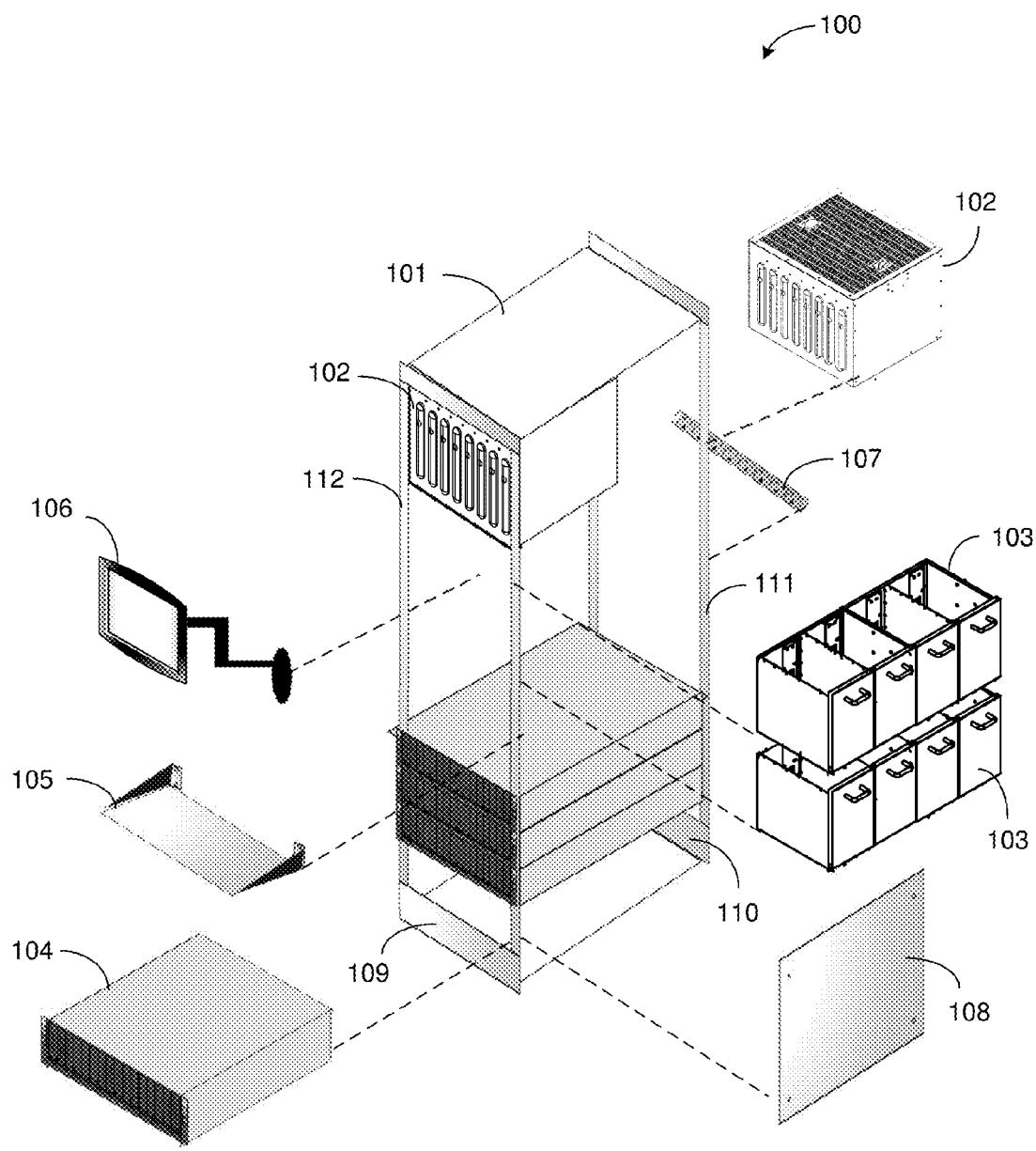
FIG. 1 is a high-level exploded view of a rack system associated with a universal test station, according to certain embodiments.

According to certain embodiments, a universal test station for testing wireless devices such as wireless routers, cable modems, set top boxes, cable modems with eMTA (Embedded Multimedia Terminal Adapter, a combination cable modem and telephone adapter) comprises a modular rack with a symmetrical architecture and compact footprint. The symmetrical design provides for easy installation of the universal test station equipment. For example, the equipment includes:

2 MOCA harnesses
4 Faraday cages (each cage has 4 device test slots but the embodiments not restricted to 4 slots per Faraday cage. The number of slots per Faraday cage may vary from implementation to implementation)
4 servers (the embodiments not restricted to 4 servers per rack. The number of servers per rack may vary from implementation to implementation).
keyboard and mouse
computer screen
4 PDUs (power distribution unit with multiple outputs to distribute electric power to the equipment in the universal tester station FIG. 1 is a high-level exploded view of a rack system associated with a universal test station, according to certain embodiments. FIG. 1 shows a top perspective view of a universal test station 100 set-up that includes a rack 101, MOCA harnesses 102, Faraday cages 103, test servers 104, keyboard and mouse shelf 105, computer screen 106 with attachment, power distribution units 107 and cover plates 108. The embodiments not restricted to 4 Faraday cages per rack. The number of Faraday cages per rack may vary from implementation to implementation The symmetrical design of rack 101 accommodates 2 Faraday cages on the right side 111 of rack 101 and another 2 Faraday cages (not shown in FIG. 1) on the left side 112 of rack 101. Similarly, the symmetrical design of rack 101 accommodates one MOCA harness that is accessible at the front side 109 of rack 101 and another MOCA harness that is accessible at the rear side 110 of rack 101. Further, rack 101 can accommodate 4 servers. The embodiments not restricted to 4 servers per rack. The number of servers per rack may vary from implementation to implementation.

As can be seen from FIG. 1, the symmetrical design of the rack not only provides for easy installation but also provides easy access to the test equipment supported by the rack. For example, as can be from FIG. 1, each test slot of the Faraday cages are easily accessible from the right side 111 and left side 112 of rack 101. The test slots of the Faraday cages are easily accessible because the door assemblies face outward away from the rack. The computer screen 106, mouse and keyboard shelf are easily accessible from the front side 109 of rack 101.

According to certain embodiments, the compact footprint of the rack 101 allows for the set up of multiple similar racks in the testing area of a room. According to certain embodiments, each rack 101 is approximately 7 feet in height and 3 feet in width and has a depth that can accommodate the Faraday cages as described herein. Each rack 101 can be assembled using standard 19 inch rack rails and rack shelves that are approximately 3 feet in width and with a depth that can accommodate the Faraday cages as described herein. Further, rack 101 is not restricted to 4 Faraday cages, 4 servers, and 4 PDUs. Since rack 101 is modular in nature, rack 101 can be easily expanded to support an increased number of MOCA harnesses and/or Faraday cages and/or servers and/or PDUs, etc., depending on the floor space available and/or the needs or business objectives or technical objectives of the test facility or of the associated enterprise. Similarly, modular rack 101 can be easily reduced to support a reduced number of MOCA harnesses and/or Faraday cages and/or servers and/or PDUs, etc.

As a non-limiting example, each universal test station 100 is supplied with Internet connectivity for remote management and technical support of the universal test station 100. As a non-limiting example, Internet access for the universal test station 100 comprises a static public IP address. As another non-limiting example, each universal test station 100 has two "20A" outlets.

According to certain embodiments, as a non-limiting example, each server in the universal test station 100 is of a 3U rackmount size (e.g., 17.1"×5.1"×25.5") and supports the testing of 4 devices under test (DUTs) simultaneously. Each DUT when undergoing tests are installed in a given test slot of a given Faraday cage of universal test station 100.

According to certain embodiments, as a non-limiting example, the computer screen, keyboard and mouse (not shown in FIG. 1) are used for interacting with a web based GUI (e.g., GUI is an operator dashboard used for setting up the tests for one or more DUTs). The computer screen is attached to a wall mount arm, which in turn is attached to the rack. The computer screen can be rotated 90° and can be tilted downwards according to the needs of the operator.

As a non-limiting example, each server is equipped with at least the following components of the latest engineering design (if appropriate):

7× Quad Ethernet Card: Network interface cards are used to test the LAN/WAN functionality of the device under test (DUT). The ports include cables that connect to the connector plate of a given test slot of a given Faraday Cage (there are 4 test slots in a Faraday cage, according to certain embodiments). The DUT is connected to the server ports through the connector plate.

4× Dual Band Wireless Adapter: The adapter cards are used to test the WiFi functionality of the DUT. Each adapter card supports 2 bands (2.4 GHz and 5 GHz) and IEEE 802.11 b/g/n/ac standard. The SMA (SubMiniature version A connectors or semi-precision coaxial RF connectors) cables run from the adaptor card ports to the connector plates of a given Faraday Cage where WiFi antennas are connected.

According to certain embodiments, there are total of 4 Faraday (RF) cages per universal test station 100. Each RF cage supports 4 test slots to support a total of 16 slots. Two of the RF cages are on right side of Rack 101 and the other two RF cages are on left side of Rack 101. The RF cages help protect the DUT from WiFi interference from nearby devices and DUTs. The WiFi signal strength and reverse/forward bandwidth of signals are improved to great extent through the use of RF cages, according to certain embodiments.

Figure 2:
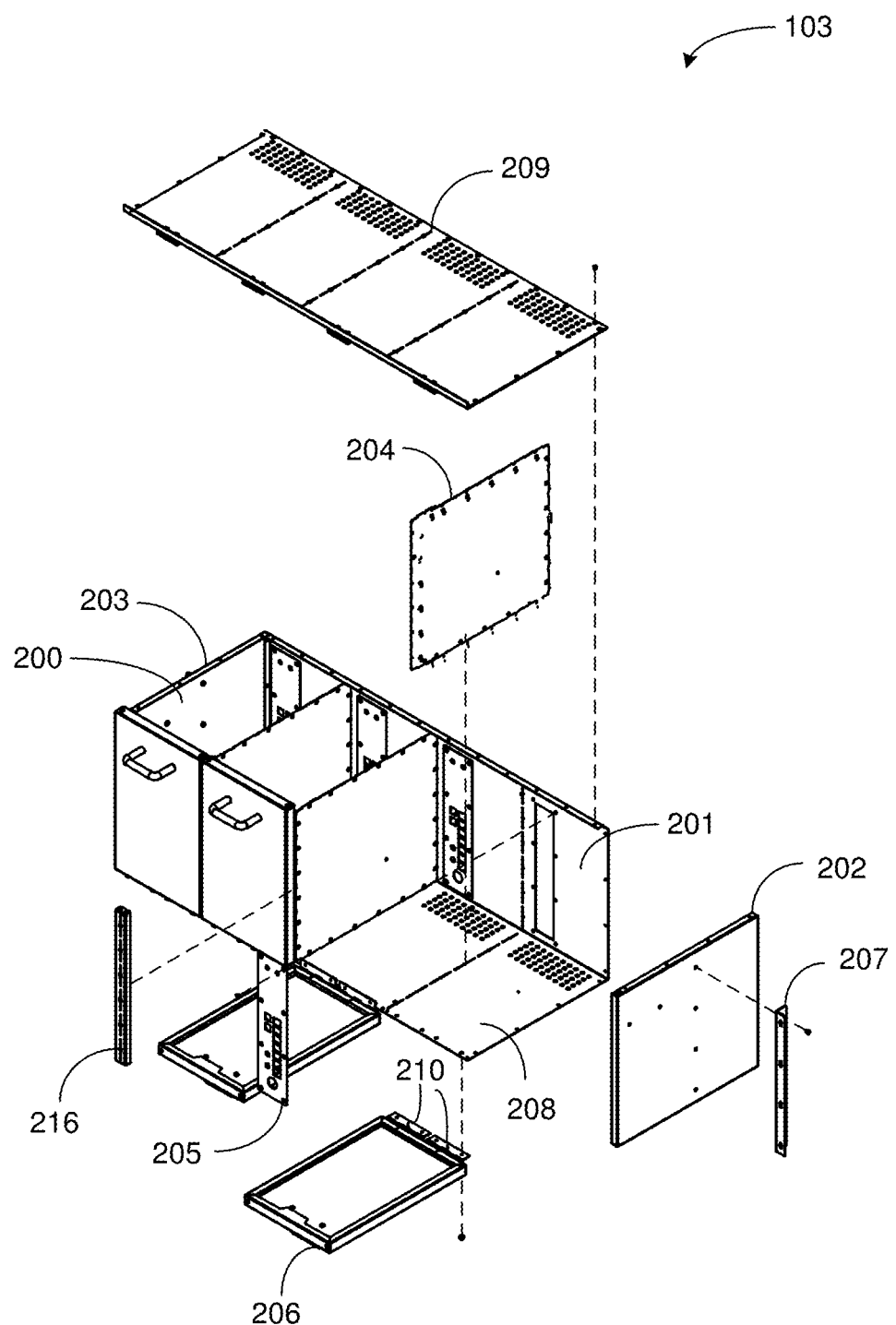
FIG. 2 is a high-level diagram of an exploded view of a Faraday cage associated with the universal test station, according to certain embodiments.

FIG. 2 is a high-level diagram of an exploded view of a Faraday cage associated with the universal test station, according to certain embodiments. In FIG. 2, Faraday cage 103 comprises 4 test slots (e.g., test slot 200). Faraday cage 103 includes a back plate 201, right end plate 202, left end plate 203, 3 septum walls (such as septum wall 204), 4 connector plates (such as connector plate 205), 4 door assemblies (such as door assembly 206) with hinges 210, 3 center stiles (such as center stile 216), 2 rack ears (such as rack ear 207), a base plate 208, and a top plate 209, according to certain embodiments. The embodiments are not restricted to 4 slots per Faraday cage. The number of slots per Faraday cage may vary from implementation to implementation. The sizing of rack 101 can be modified to accommodate Faraday cages that have more than or less than 4 slots per Faraday cage according to certain embodiments.

Figure 3:
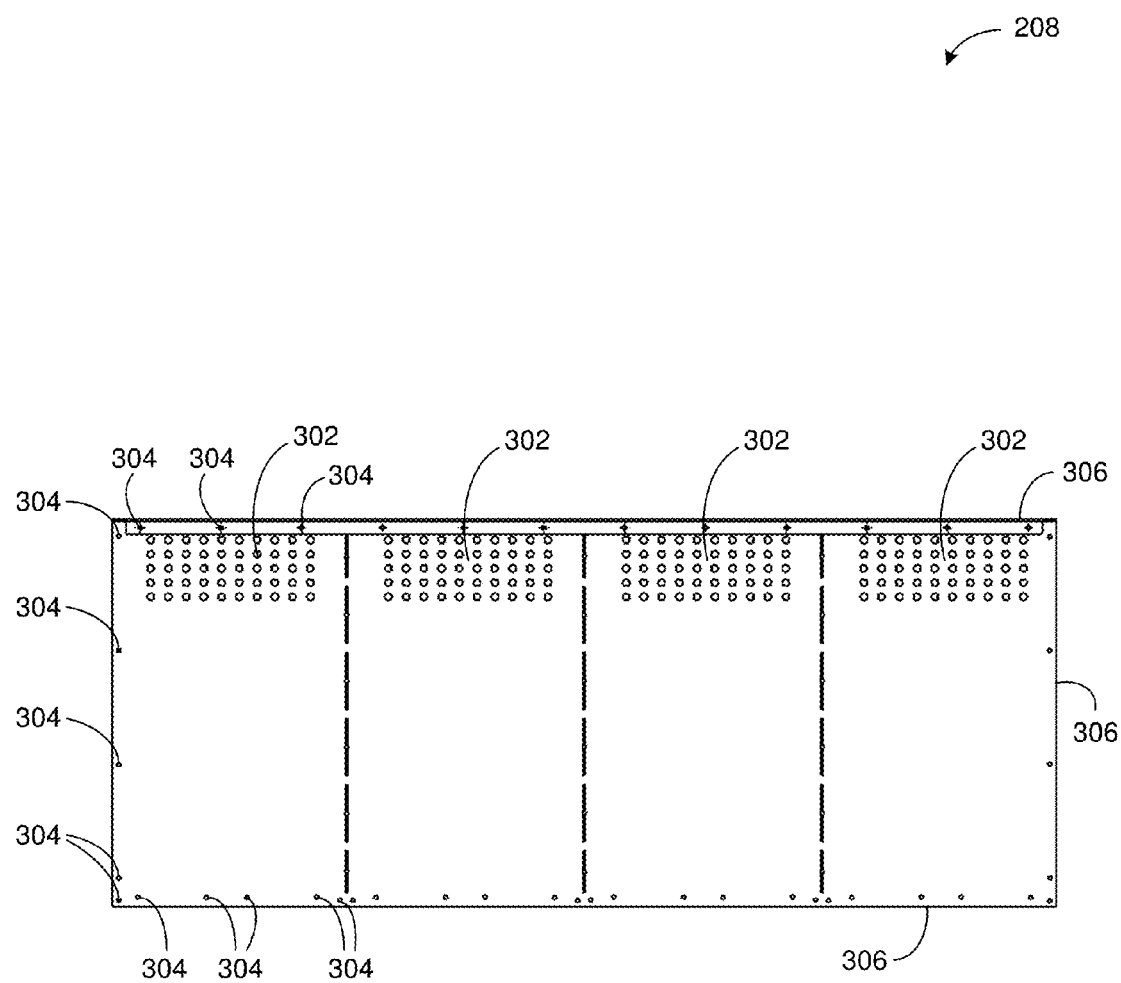
FIG. 3 is a high-level diagram of an enlarged view of the base plate of a Faraday cage associated with the universal test station, according to certain embodiments.

FIG. 3 is a high-level diagram of an enlarged view of the base plate of a Faraday cage associated with the universal test station, according to certain embodiments. In FIG. 3, base plate 208 of a Faraday cage associated with the universal test station comprises air holes 302 and a plurality of rivet holes 304 (for assembling a given Faraday cage) as can be seen around the perimeter 306 of base plate 208, according to certain embodiments.

Figure 4:
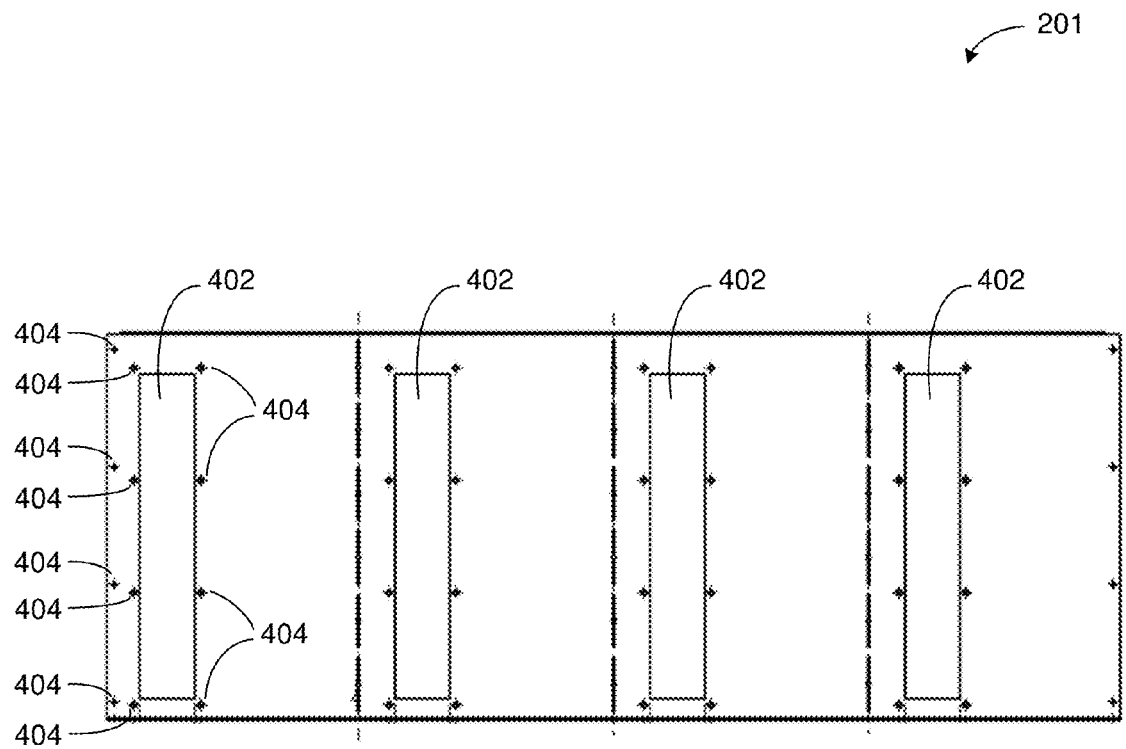
FIG. 4 is a high-level diagram of an enlarged view of the back plate of a Faraday cage associated with the universal test station, according to certain embodiments.

FIG. 4 is a high-level diagram of an enlarged view of the back plate of a Faraday cage associated with the universal test station, according to certain embodiments. In FIG. 4, back plate 201 of a Faraday cage associated with the universal test station comprises cut-outs 402 for associated connector plates (e.g., see connector plate 205 of FIG. 2), and a plurality of rivet holes 404 (for assembling a given Faraday cage and for installing the connector plates), according to certain embodiments.

Figure 5:
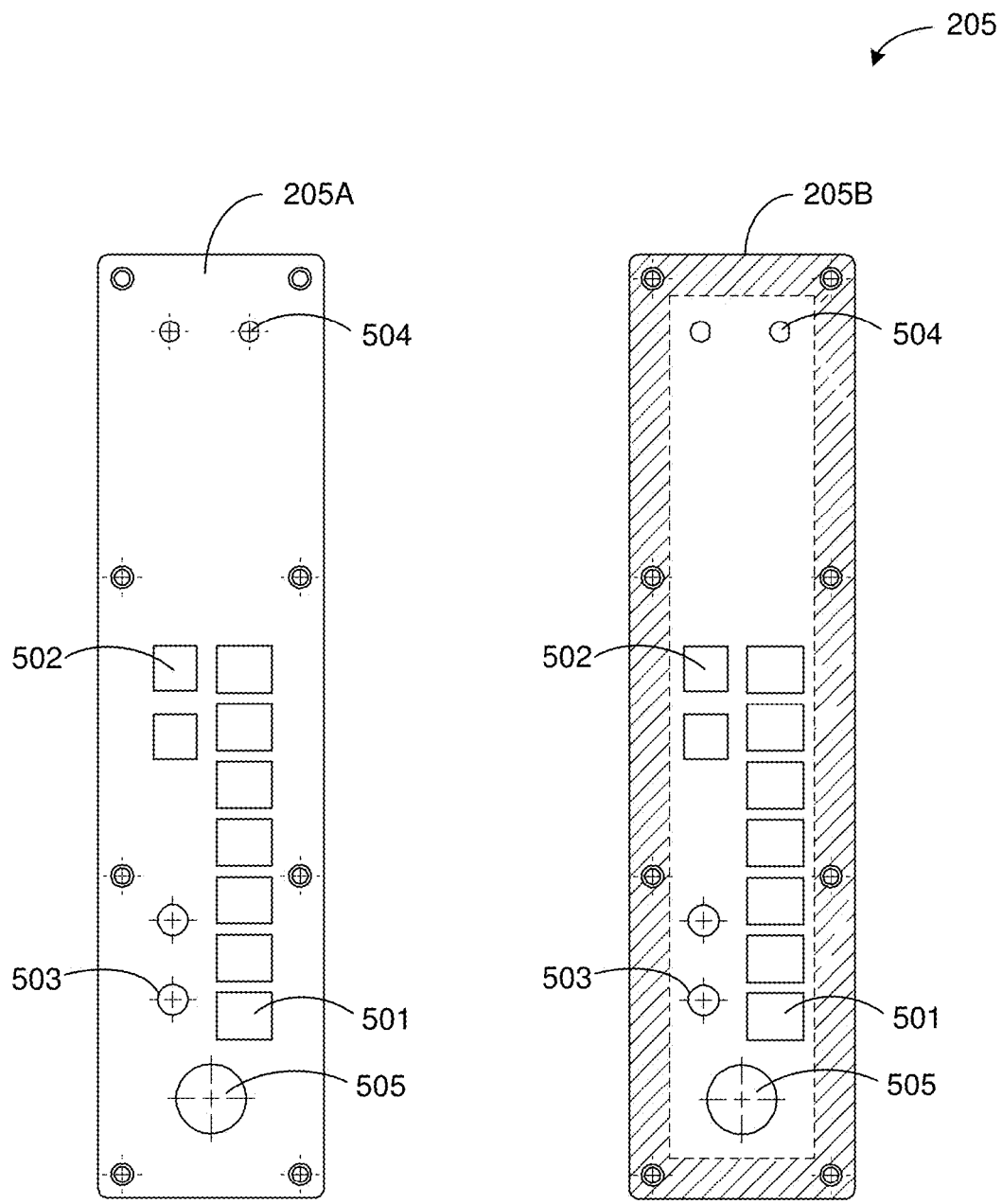
FIG. 5 is a high-level diagram of an enlarged view of the connector plate of a Faraday cage associated with the universal test station, according to certain embodiments.

FIG. 5 is a high-level diagram of an enlarged view of the connector plate of a Faraday cage associated with the universal test station, according to certain embodiments. FIG. 5 shows a front view 205A, and a back view 205B of connector plate 205. Connector plate 205 includes 7 RJ45 coupler holes 501, 2 RJ12 coupler holes 502, 2 F-Jack to F-Jack adapters 503, 2 SMA connectors 504, and a power harness 505, according to certain embodiments. A given DUT is installed one of the slots of a Faraday cage. The installed DUT is thus connected to the LAN, MOCA, WIFI interfaces (associated with the universal test station) and power through the connector plate 205, according to certain embodiments.

Figure 6:
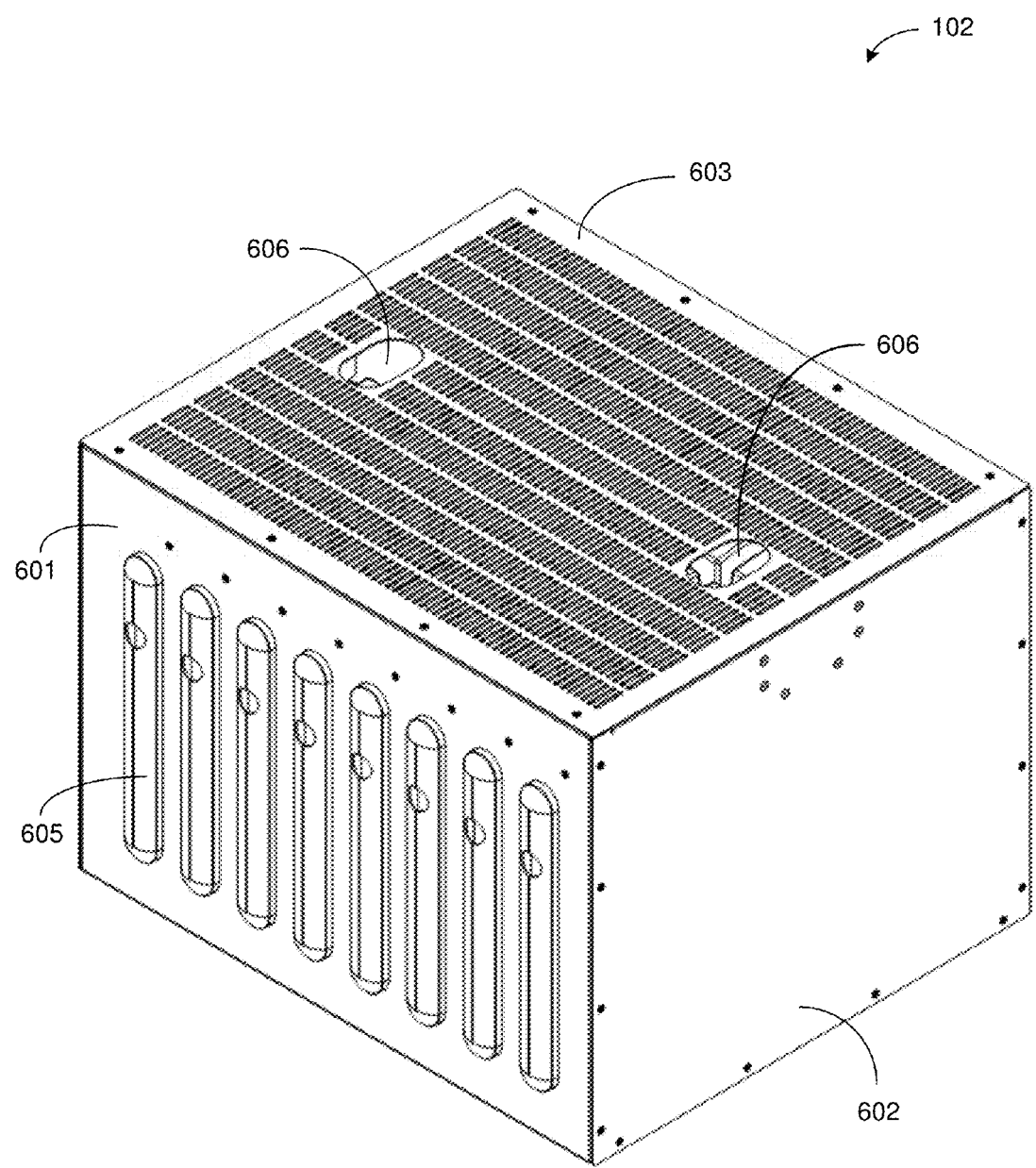
FIG. 6 is a high-level diagram of a perspective view of a MOCA harness associated with the universal test station, according to certain embodiments.

FIG. 6 is a high-level diagram of a perspective view of a MOCA harness associated with the universal test station, according to certain embodiments. FIG. 6 shows a MOCA harness 102 that includes a harness chassis 601, end plates (such as end plate 602), a top plate 603 (with holding holes 606) and 16 router brackets 605 (8 router brackets on each side of the harness chassis). The router brackets 605 are associated with wireless routers configured as MoCA LAN Bridge and MoCA WAN Bridge for the test slots of the Faraday cages. Thus, each MoCA harness has total of 8 MoCA LAN Bridges and 8 MoCA WAN Bridges, according to certain embodiments. The MoCA LAN Bridges and MoCA WAN Bridges are used for testing the MoCA LAN/WAN functionality of a given DUT, according to certain embodiments.

Figure 7:
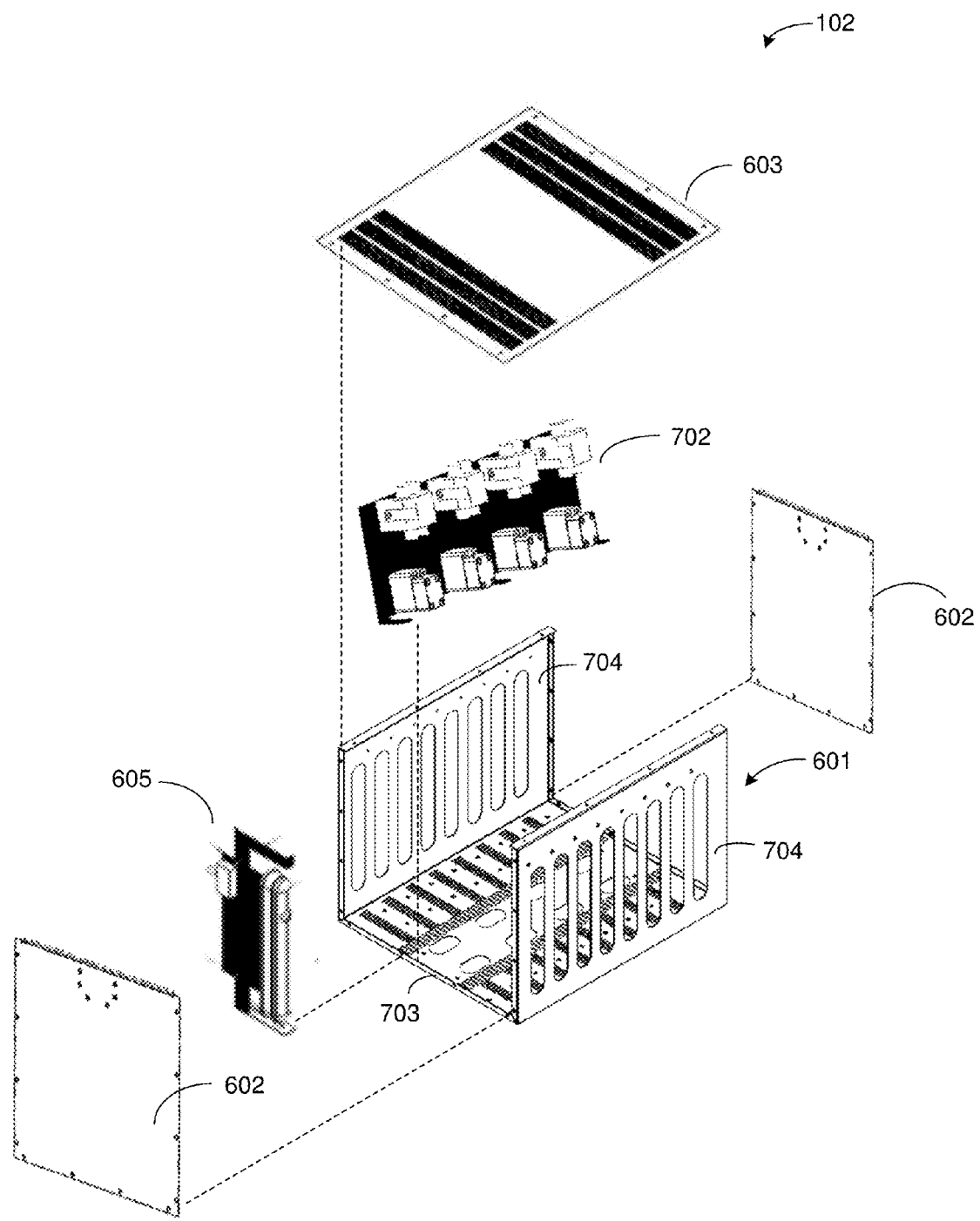
FIG. 7 is a high-level diagram of an exploded view of a MOCA harness associated with the universal test station, according to certain embodiments

FIG. 7 is a high-level diagram of an exploded view of a MoCA harness 102 associated with the universal test station, according to certain embodiments. FIG. 7 shows a MoCA harness 102 that includes a harness chassis 601 (with bottom plate 703, and side walls 704), end plates 602, a top plate 603 and router brackets 605 (there are 8 router brackets on each side of the harness chassis 601, but only one router bracket 605 is shown in FIG. 7), and 2 splitter assemblies 702 (only one splitter assembly 702 is shown in FIG. 7). The splitter assembly 702 is designed to help in cable management and the routing of cables from the MoCA harness 102 (shown in FIG. 6) to the connector plates 205 (shown in FIGS. 2 and 5 of the Faraday cages 103. Further, the splitter assembly 702 makes for easy maintenance and convenient replacement of parts such as attenuators and splitters, according to certain embodiments.

Figure 8:
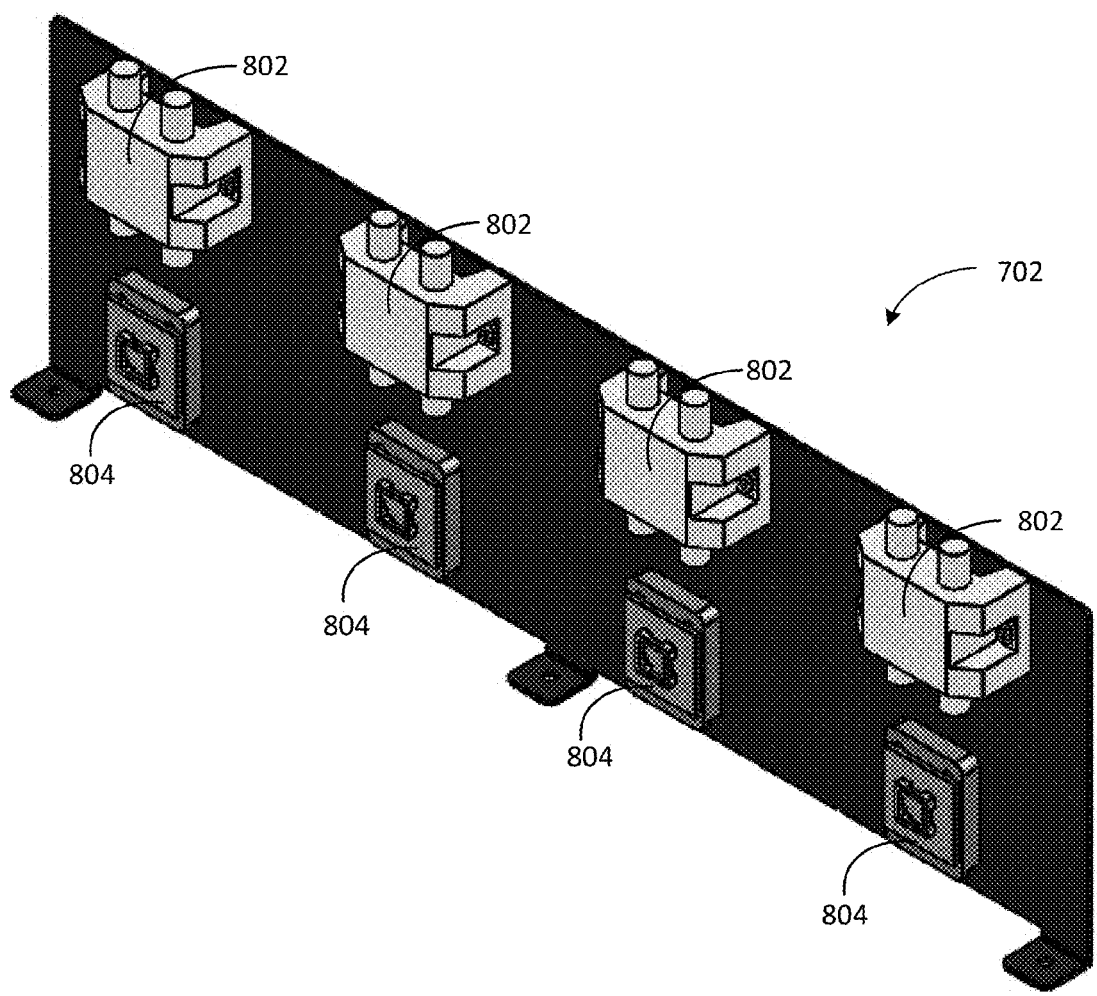
FIG. 8 is a high-level diagram of a perspective view of a splitter assembly of the MOCA harness associated with the universal test station, according to certain embodiments.

FIG. 8 is a high-level diagram of a perspective view of a splitter assembly of the MOCA harness associated with the universal test station, according to certain embodiments. In FIG. 8, the splitter assembly 702 includes four 3-way splitters 802, and 4 wire tabs 804, according to certain embodiments.

Figure 9:
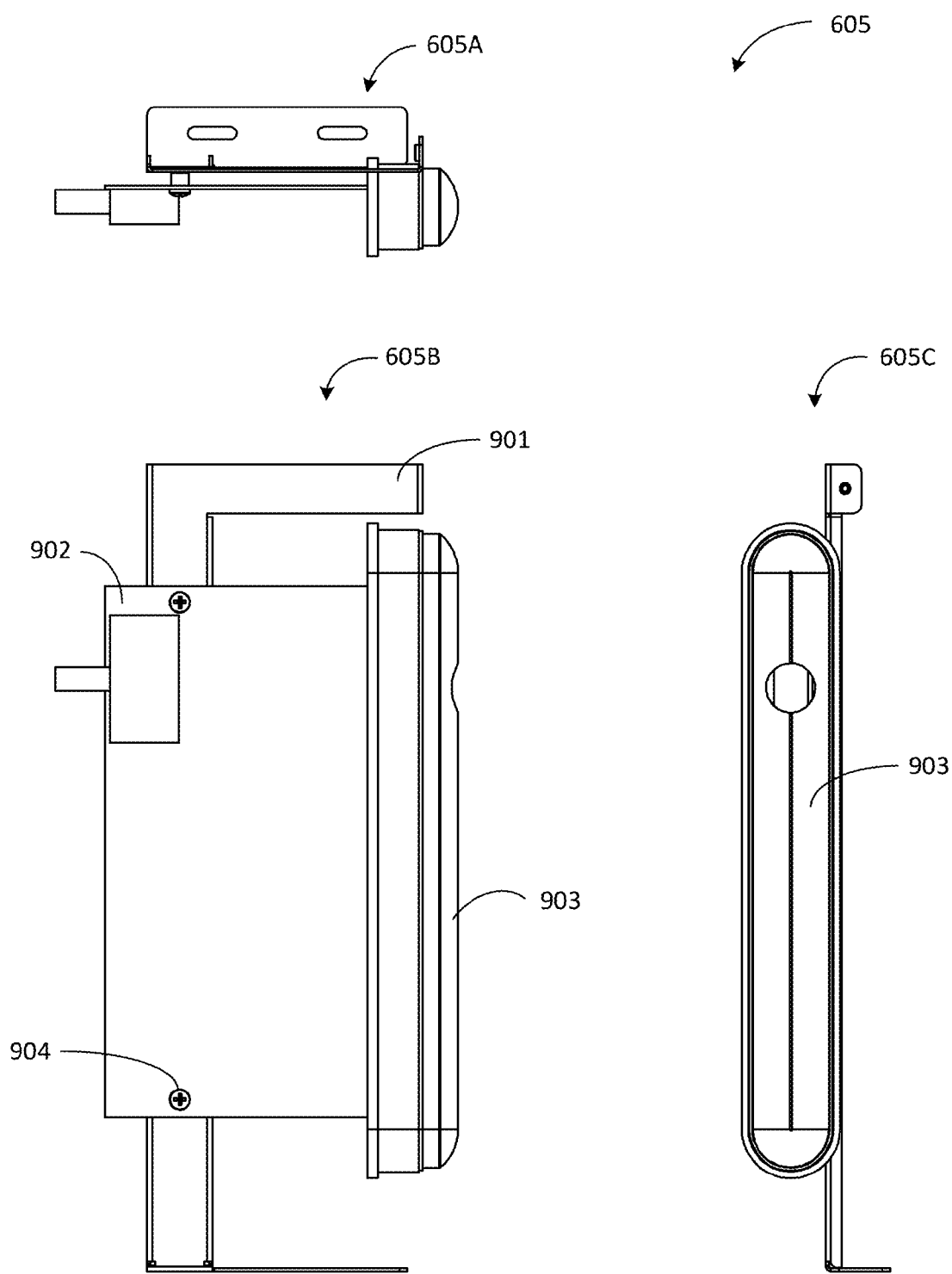
FIG. 9 is a high-level diagram of a router bracket of the MOCA harness associated with the universal test station, according to certain embodiments.

FIG. 9 is a high-level diagram of a router bracket of the MoCA harness associated with the universal test station, according to certain embodiments. FIG. 9 shows a top view 605A, a right side view 605B and a front side view 605C of the router bracket 605, according to certain embodiments. Router bracket 605 includes a bare modem card bracket 901, a printed circuit board 902, a front bezel 903, and screws 904, according to certain embodiments.

In the foregoing specification, embodiments of the present disclosure have been described with reference to numerous specific details that may vary from implementation to implementation. The specification and drawings are, accordingly, to be regarded in an illustrative rather than a restrictive sense.

We claim:

1. A universal test station comprising:
    a modular rack comprising a plurality of shelves, the modular rack having a front, a rear, a first side, and a second side;
    a plurality of servers stored on a server section of the modular rack;
    a first set of Faraday cages stored on the first side of the modular rack, each Faraday cage in the first set of Faraday cages defining a first internal chamber;
    a corresponding first set of door assemblies partially defining the first set of Faraday cages, each door assembly of the first set of door assemblies when opened exposing an opening in each Faraday cage of the first set of Faraday cages, each opening configured to provide access to each first internal chamber from the first side of the modular rack;
    a second set of Faraday cages stored on the second side of the modular rack, each Faraday cage in the second set of Faraday cages defining a second internal chamber; and
    a corresponding second set of door assemblies partially defining the second set of Faraday cages, each door assembly of the second set of door assemblies when opened exposing an opening in each Faraday cage of the second set of Faraday cages, each opening configured to provide access to each second internal chamber from the second side of the modular rack.

2. The universal test station of claim 1, further comprising a plurality of power distribution units.

3. The universal test station of claim 1, further comprising a computer screen affixed to the modular rack.

4. The universal test station of claim 1, further comprising a keyboard and mouse shelf affixed to the modular rack.

5. The universal test station of claim 1, wherein each Faraday cage of at least a subset of the first and second sets of Faraday cages comprises:
    a plurality of test slots, wherein each test slot of the plurality of test slots includes a connector plate, the connector plate including a plurality of RJ45 coupler holes, a plurality of RJ12 coupler holes, a plurality of F-Jack to F-Jack adapters, a plurality of SubMiniature version A (SMA) connectors, and a power harness.

6. The universal test station of claim 1, further comprising a first Multimedia over Coax Alliance (MoCA) harness stored on the front of the modular rack, and a second MoCA harness stored on the rear of the modular rack, wherein each MoCA harness comprises:
    a plurality of router brackets that are associated with a corresponding plurality of wireless routers configured as MoCA local area network (LAN) Bridges and MoCA wide area network (WAN) Bridges; and
    a plurality of splitter assemblies wherein each splitter assembly of the plurality of splitter assemblies includes a corresponding plurality of 3-way splitters.

7. The universal test station of claim 6, wherein each MoCA harness further comprises:
    a harness chassis, the harness chassis comprising a bottom plate, side walls extending upwardly from sides of the bottom plate, end plates extending upwardly from ends of the bottom plate, and a top plate contacting ends of the side walls opposite the bottom plate, the harness chassis defining a harness chamber;
    wherein the plurality of router brackets and the plurality of splitter assemblies are received in the harness chamber.

8. The universal test station of claim 6, wherein each splitter assembly in the plurality of splitter assemblies further comprises a plurality of wire tabs, each wire tab in the plurality of wire tabs spaced from a corresponding 3-way splitter.

* * * * *